United States Patent [19]

Lamb

[11] Patent Number: 4,875,588

[45] Date of Patent: Oct. 24, 1989

[54] METHOD AND APPARATUS FOR UNLOADING SLIDE PROJECTOR TRAYS

[75] Inventor: Owen L. Lamb, Los Gatos, Calif.

[73] Assignee: Slide Management Systems, Inc., Los Gatos, Calif.

[21] Appl. No.: 54,383

[22] Filed: May 26, 1987

[51] Int. Cl.$^4$ .............................................. B07C 5/00
[52] U.S. Cl. .................................... 209/3.3; 209/583; 209/698; 364/478; 414/404
[58] Field of Search ............... 209/547, 548, 569, 583, 209/698, 702, 706, 553, 564, 3.3; 222/9, 10, 119, 212, 121; 194/906; 414/404, 414, 32, 786; 353/112, 113; 384/478; 40/361; 235/462, 481

[56] References Cited

U.S. PATENT DOCUMENTS

| | | | |
|---|---|---|---|
| 3,550,770 | 12/1970 | Lund | 209/583 |
| 3,731,060 | 5/1973 | Weinstein | 209/583 |
| 3,757,944 | 9/1973 | Goodman | 209/583 |
| 4,024,966 | 5/1977 | Schenck | 353/112 X |
| 4,250,028 | 2/1981 | Talyzin et al. | 209/583 |
| 4,354,745 | 10/1982 | Armstrong | 414/404 X |
| 4,485,611 | 12/1984 | Fuller | 353/112 X |
| 4,519,522 | 5/1985 | McElwee | 414/273 X |
| 4,652,733 | 3/1987 | Eng et al. | 235/462 |
| 4,693,373 | 9/1987 | Lamb et al. | 209/564 X |

Primary Examiner—Robert B. Reeves
Assistant Examiner—Donald T. Hajec
Attorney, Agent, or Firm—Owen L. Lamb

[57] ABSTRACT

A computer-controlled slide projector tray unloader for use with a slide archival storage system. A slide magazine (10) is placed below a slide gate (7). A tray (9) is held above the slide gate such one of the compartments coincides with the slide gate. A transporting mechanism (30) at the slide gate (7) transports a slide from the selected one compartment of the tray such that the slide drops into the magazine (10). An advance mechanism is provided for advancing the tray to position a particular compartment to coincide with the slide gate. A Tray Table maintained by software running on the computer associates a unique location number for each one of the plurality of compartments of the tray with a previously assigned serial number, each serial number identifying a slide stored in a compartment of the tray. A Current location number generator operative in connection with the advancing mechanism generates a current location number which represents the unique location number of the slide compartment currently coinciding with the slide gate (7). The tray is advanced until the generated location number matches the location number in the Tray Table corresponding to the desired slide.

20 Claims, 10 Drawing Sheets

METHOD AND APPARATUS FOR UNLOADING SLIDE PROJECTOR TRAYS

CROSS REFERENCES TO RELATED APPLICATIONS

U.S. Pat. No. 4,693,373 granted Sept. 15, 1987 of Lamb, et al., entitled "Slide Archival Storage and Retrieval System", and U.S. Pat. No. 4,776,689 granted Oct. 11, 1988 of William R. Maclay, entitled "Slide Magazine for Storage and Retrieval System", both assigned to Slide Management Systems, Inc., the assignee of the present invention.

BACKGROUND OF THE INVENTION

The present invention relates to computer peripheral devices and more particularly to an apparatus for transferring photographic slides from a projector tray to storage bins, magazines or cartridges automatically under computer control.

Prior devices exist for automating some slide handling functions. In U.S. Pat. No. 4,249,329, "Apparatus for Viewing and Sorting Photographic Slide Transparencies," granted on Feb. 10, 1981 to Owen L. Lamb, there is described an apparatus for sorting photographic slides into storage bins. In U.S. Pat. No. 4,338,738, "Slide Previewer and Tray Loader," granted on July 13, 1982 to Owen L. Lamb, there is described a mechanism by which slides are loaded into compartments of a circular slide tray.

In the above-identified U.S. Pat. No. 4,693,373 there is described an apparatus for storing slides in slide receptacles that may be either storage bins in which slides are stored horizontally or compartments of a projector tray in which slides are stored vertically. This is accomplished by providing a movable turntable having a plurality of slide bins or a circular slide projector tray thereon. A hopper holds a group of slides in a stack above the turntable, and delivers slides one by one to a position above the sorting table. Each individual slide within the stack is identified by generating an accession number for each slide as the slide is delivered from the hopper. The accession number may be derived from the relative position of the slide within the stack or may be derived from a number read from a coded label on the slide mount. A computer utilizes the slide's accession number in accordance with a sorting algorithm to move the turntable to position a particular slide receptacle relative to the slide's position above the turntable.

In the above-identified U.S. Pat. No. 4,776,689 there is described a slide magazine that can be used in the computer-controlled automatic slide archival storage and retrieval system of U.S. Pat. No. 4,693,373.

These prior devices do not provide for the returning to archival storage of slides after projection, that is, unloading a projector tray.

The primary object of the present invention is to provide a computer-controlled automatic slide transferring system which will enable one to rapidly transfer slides from projector trays to a storage place for future retrieval of the slides and provide a computer record of where each slide is stored.

DISCLOSURE OF THE INVENTION

Briefly, the above object is accomplished in accordance with a preferred embodiment of the invention by providing a mechanism which holds a projector tray above a cartridge such that one of the slide compartments in the tray coincides with a slide gate. A slide transporting mechanism at the slide gate lowers a slide from the one compartment of the tray such that the slide drops into the cartridge. The location of each individual slide within the projector tray is specified by recalling a software-maintained tray table which associates each slide stored in the tray with a tray compartment location number.

In accordance with an aspect of the invention, an electronically readable bin-code label (BIN #) that distinguishes a particular slide cartridge from others of similar slide cartridges is affixed to the cartridge. An electronically readable tray-code label (TRAY #) is affixed to a slide projector tray. The slide cartridge is moved to a position under the projector tray such that the first electronically readable coded label is read by a bin-code reading station to thereby produce a bin-code number (BIN #). The tray-code label is read by a tray-code reading station to thereby produce a tray-code number (TRAY #). The BIN # is utilized in conjunction with the TRAY # to update a digital record (TRAY TABLE and BIN TABLE) indicating that the particular slide in the projector tray has been transferred to and stored in the one particular storage cartridge.

The invention has the advantage that one can quickly return slides to storage by dropping the slides into selected archival storage cartridges.

The invention has the further advantage that by using an indirect addressing technique slides can be kept track of without having to place labels on each slide.

BRIEF DESCRIPTION OF THE DRAWINGS

The foregoing and other objects, features, and advantages of the invention will be apparent from the following detailed description of preferred embodiments of the invention as illustrated in the accompanying drawings wherein.

DESCRIPTION

Figure 1:
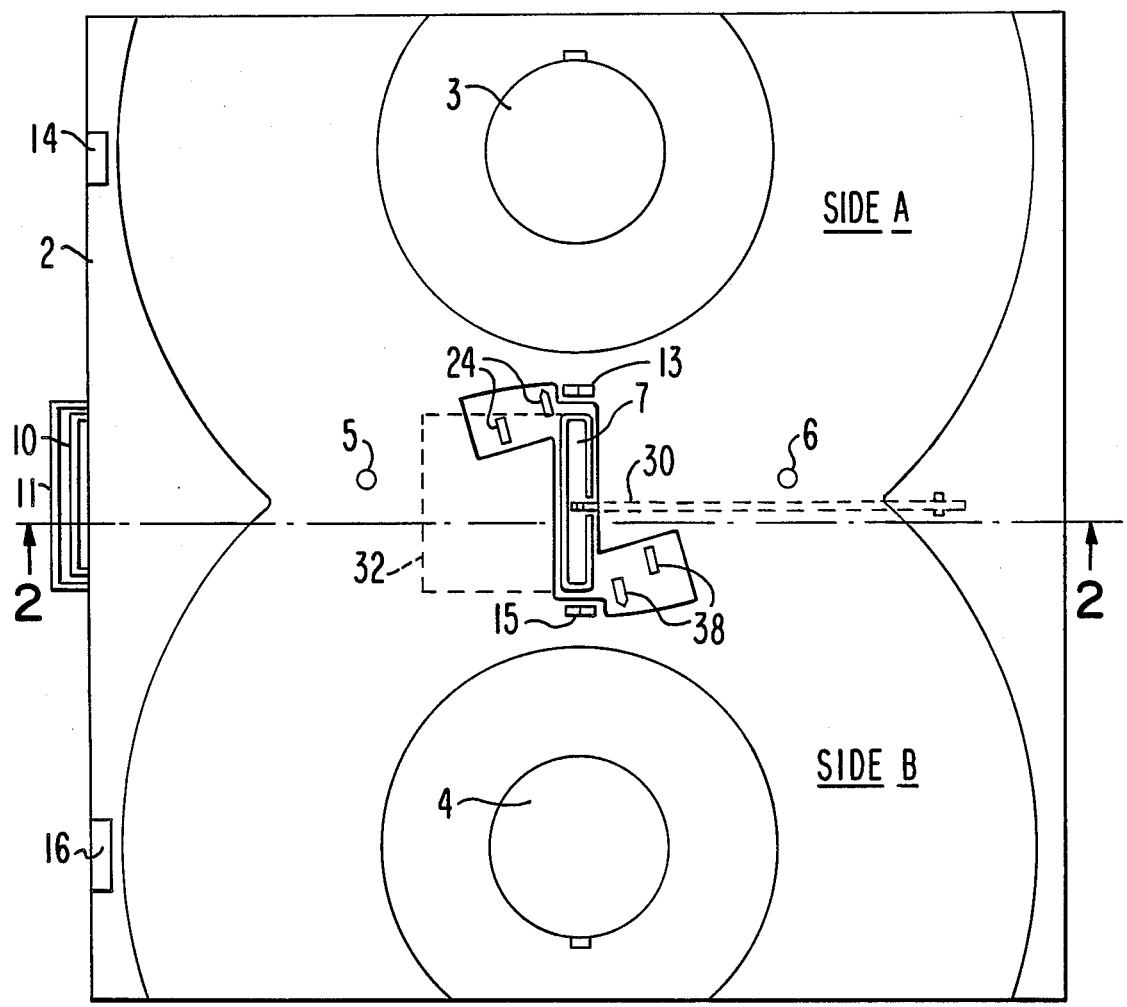
FIG. 1 is a top view of an apparatus for transferring photographic slides from a projector tray to storage cartridges in which the present invention is embodied.

The basic storage module of the system is a cartridge (10). The cartridges used may be storage bins open at the top, magazines of the type described in the above-identified patent 4,693,373, or slotted trays wherein slides are stored vertically in slots or slotted trays wherein slides are stored vertically in slots or compartments. For purposes of this specification the term cartridge will be used to include bins, cartridges, slotted trays, and 40-slide magazines.

Data correlated with slide images are entered into a computer by a means of a suitable program such as CYMAGERY TM, published by Stock Imagery, Inc. 711 Kalamath, Denver, Colo. 80204. This program will find image data, file image data, and track image data stored in its data base. Image data are filed by descriptors chosen from a dictionary of descriptors.

CYMAGERY TM automatically assigns a unique serial number to the slide and the image data corresponding to that slide and assigns the slide to a fixed location in physical storage. The image serial number consists of General Subject number, Specific Subject number, Page number, and slot number (because CYMAGERY TM is intended for use with plastic slotted pages). For example, image Ser. No. 025 003 001 12 has the general subject 025, the specific subject 003 and is to be stored at page 001 and slot 12 on that page. The software of the present invention uses this serial number to uniquely identify the slide, but the slides are stored at computer-specified random locations in the storage system (any projector tray compartment location or any cartridge position) using a novel indirect addressing technique.

Figure 2:
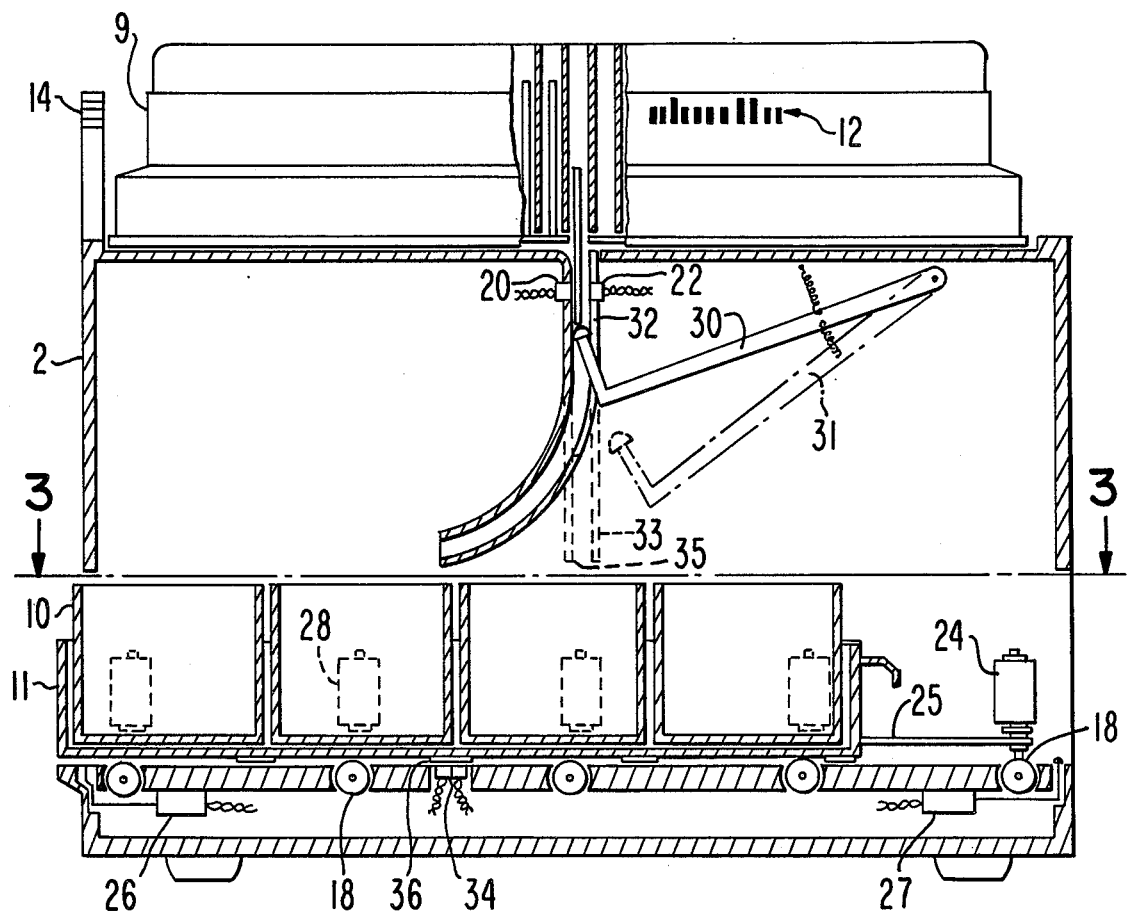
FIG. 2 is a right side sectional view of the apparatus of FIG. 1 taken along the view lines 2—2.

As shown in FIG. 2, each projector tray (9) has a label (12) thereon which has a coded number (TRAY #) which identifies the tray. An optical tray-code reader (14; 16), is used to read the number of the projector tray loaded into the apparatus. The slides are loaded into the 80-slide compartment Carousel TM tray, at one of the 80 locations specified by a location number (LOC #) corresponding to a tray compartment. To initially enter slides into the system, the slides are loaded in compartments of the projector tray and the compartment location number (LOC #) and tray number (TRAY #) are manually entered into the CYMAGERY TM software. Alternatively, the automatic tray loading apparatus described in the above-identified U.S. Pat. No. 4,693,373 may be used to load projector trays, in which case the tray number is read from the label on the tray by a code-reader and the location numbers are automatically calculated and placed in a Tray Table (shown below) created for this tray number. This is described in more detail below.

The software of the present invention uses this number (TRAY #) to recall the tray table for this tray. As each slide is loaded into a compartment of the tray, the Tray Table is updated by the software to correlate the slide's serial number (assigned by CYMAGERY TM) with the current compartment location (LOC #). All or some of the slides may have coded-labels affixed to them. A one in the column of the Tray Table labelled L indicates that the slide has a slide-code label affixed to it. A zero in the column labelled L indicates that the slide does not have a slide-code label affixed to it. A one in the column labelled V indicates that the slide in this location has been verified as belonging in that location. This is done when the tray is loaded. If the slide does not carry a label (L=0) verification is done visually, in which case the user sets the V bit to one in the appropriate row via the computer keyboard. If the slide does carry a label (L=1) the verification is done automatically by software using a serial number obtained from the slide-code label. A zero in the column labelled P indicates that the slide was loaded for reverse (backscreen) projection. A one in the column labelled P indicates that the slide was loaded for normal projection. Usually an entire tray will be loaded for one kind of projection. The sequence number (SEQ #) column will be described subsequently. A typical tray table is shown below:

| | | CAROUSEL TM TRAY TABLE | | | | |
|---|---|---|---|---|---|---|
| TRAY # | LOC # | SLIDE SERIAL # | SEQ # | L | V | P |
| 142 | 01 | 025 003 001 13 | | 0 | 1 | 1 |
| 142 | 02 | 025 003 001 14 | | 1 | 1 | 1 |
| 142 | 03 | 025 003 001 15 | | 1 | 1 | 1 |
| 142 | 04 | 025 003 001 16 | | 1 | 1 | 1 |
| 142 | 05 | 025 003 001 17 | | 0 | 1 | 1 |
| 142 | 40 | 025 003 001 52 | | 0 | 1 | 1 |
| 142 | 79 | 025 003 001 91 | | 1 | 1 | 1 |
| 142 | 80 | 025 003 001 92 | | 1 | 1 | 1 |

Each cartridge (10) has a label thereon which has a cartridge-code number (BIN #) which identifies the cartridge. Slides are unloaded from a tray sequentially into the cartridge. If the cartridge is a 40-slide magazine, each slide assumes one of 40 locations specified by a position number (POS #) corresponding to the its sequential position in the slide cartridge.

Figure 3:
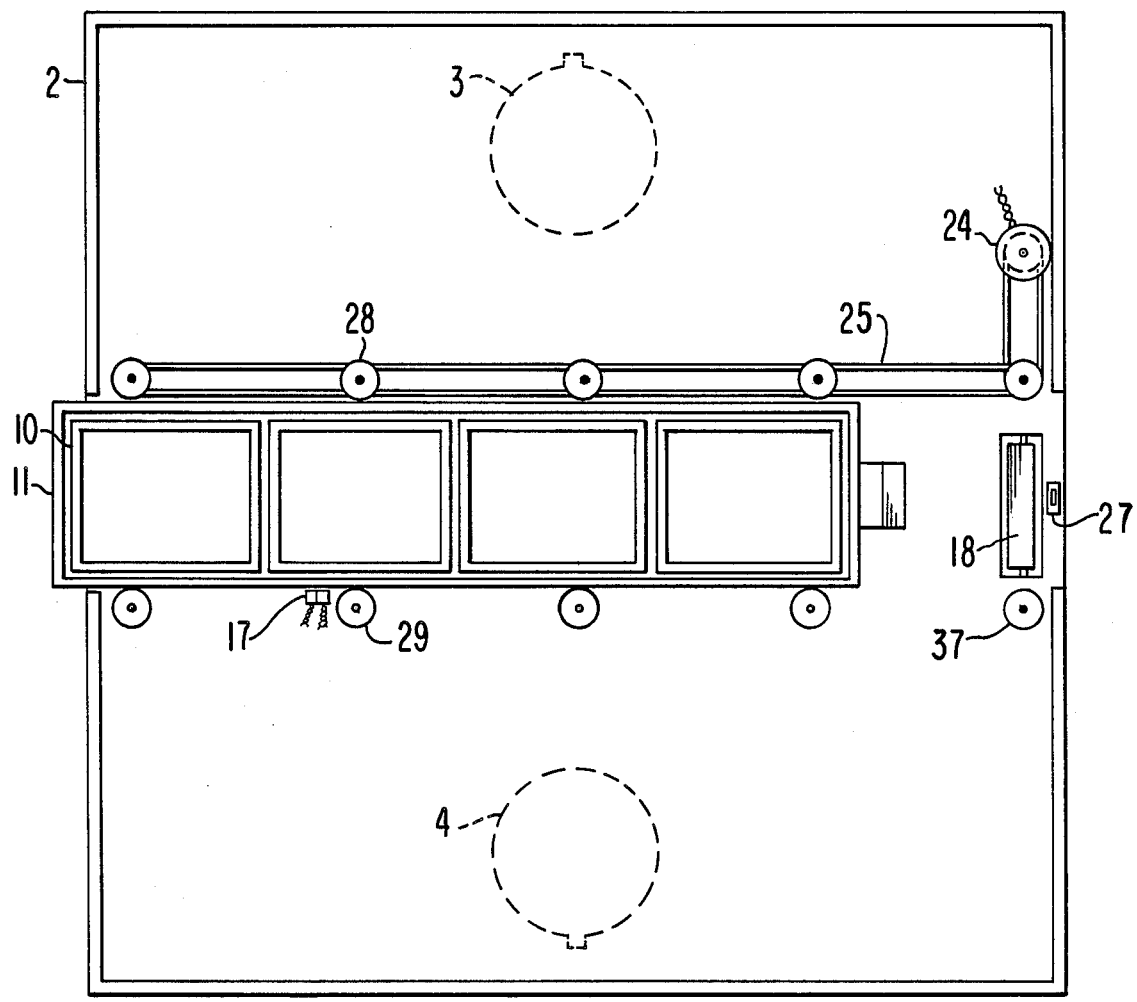
FIG. 3 is a top sectional view of the apparatus of FIG. 2 taken along view line 3—3 of FIG. 2.

The CARTRIDGE READER (17), shown in FIG. 3, reads the cartridge number (BIN #) off of the label and sends it to the computer. The software (FIG. 11) uses this cartridge number to recall a Bin Table for this cartridge (block 238). Initially, the POS # is set to one (block 240). As each slide is loaded into the cartridge, the Bin Table is updated to correlate the slide's serial number with the current slide position (POS #) in the stack in the cartridge and the POS # is incremented by one (block 202, FIG. 9).

The column labelled L is used to indicate that the slide has a slide-code label affixed to it and that it was read by the bar-code reader (20; 22) as the slide was lowered by the slide transport mechanism (30), shown in FIG. 2. A zero in the column labelled L indicates that the slide does not have a slide-code label affixed to it or that the label could not be read. A one in the column labelled V indicates that the slide in this location has been verified as belonging in that location. This is done when the tray is unloaded. If the slide does not carry a label (L=0) verification is done visually, in which case the user sets the V bit to one in the appropriate row with the aid of computer prompts. If the slide does carry a label and it was correctly read (L=1), verification is done automatically by software (FIG. 9) using the serial number from the slide-code label read by the slide-code reader (block 204). V is set to one (block 206). The sequence number (SEQ #) column will be described subsequently. A typical bin table for an empty cartridge is shown below:

| | | BIN TABLE | | | | |
|---|---|---|---|---|---|---|
| BIN # | POS # | SLIDE SERIAL # | SEQ # | L | V | P |
| 20 | 01 | | | | | |
| 20 | 02 | | | | | |
| 20 | 03 | | | | | |
| 20 | 04 | | | | | |
| 20 | 05 | | | | | |
| 20 | 39 | | | | | |
| 20 | 40 | | | | | |

Refer to FIG. 2. A drawer (11) containing four empty magazines (10) is inserted into the apparatus. A home-limit microswitch (26) senses that the tray has entered and a travel-limit microswitch (28) senses that the tray has reached the exit of the apparatus. A motor (24) drives a belt (25) which drives pulleys (28) to pull the drawer through the apparatus. The drawer is pinched on opposite sides between the drive pulleys and idler pulleys (29), and rides on rollers (18) to ensure smooth operation. The cartridge reader (17) reads the coded label on the cartridge currently in position to receive slides and recalls the Bin Table for that cartridge. As each slide is loaded into a cartridge, the Bin Table for that cartridge is updated (FIG. 9) to include the slide's serial number at the current one of 40 slide positions, starting at position 1. Each time a slide is placed in the cartridge, the position number (POS #) is increased by 1 (block 202). When the position number reaches 40, a new empty cartridge is moved (block 212) into position to receive slides, and the position number is reset to 1.

Figure 7:
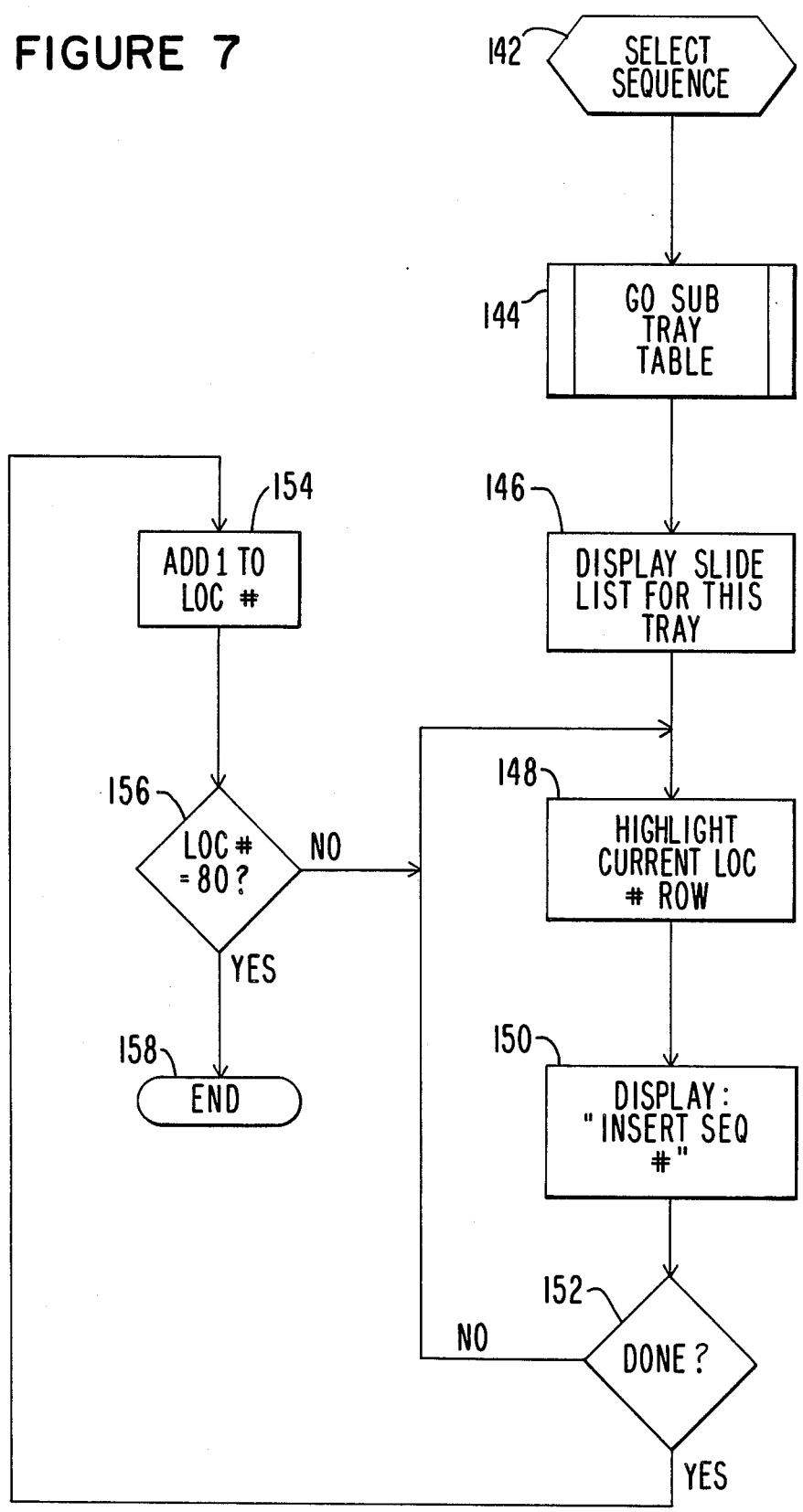

As shown in FIG. 7 of the above referenced U.S. Pat. No. 4,693,373 each slide may carry a machine-readable identification code (SLIDE SERIAL #) by which a unique number is assigned to each slide. The CYMAGERY ™ software can be commanded to direct the computer to print the serial number as a bar code on a label which can be affixed to the slide. It should be understood, however, that the principles of the invention can be practiced by utilizing the cartridge code (BIN #) described above and indexing instead of using a slide serial number label, thus avoiding having to physically place a label on each slide. In the preferred embodiment of the invention both slide labels and indexing are used. For this purpose the slide code readers (20 and 22 of FIG. 2) are located to read labels on slides, either slides oriented for front projection or reverse projection. The appropriate reader (14 or 16) is activated depending upon which side (side A or side B) that the projector tray is placed. If the slide number is read from the slide label, the software will update the Bin Table to contain the slide number actually read from the slide (block 204 of FIG. 9). The software will set V to one (block 206) in the Bin Table to indicate to the user that this location has been verified. In this manner, slides that are out of order in the projector tray will be accounted for correctly in the cartridge.

If a slide does not have a label (L=0), the serial number corresponding to the location in the Tray Table from which the slide is unloading will be used by the software to update the Bin Table. The software will set V to zero in the BIn Table to indicate to the user that this location has not been verified and must be checked visually. In this manner, slides that are out of order in the projector tray can be accounted for correctly in the cartridge by user intervention. This is easily done by placing the cartridge in the editor described in U.S. Pat. No. 4,693,373. Slides are sequentially viewed and any slides that are in the wrong location are corrected by typing the correct information into the Bin Table displayed on the computer screen.

The TRAY # and LOC # are used as a search argument into the Tray Table. The projector tray advance mechanism (24 or 28) is activated to cause the tray (11) to move the appropriate number of steps to position the tray compartment corresponding to the location number at the slide gate (7). This will occur when a match is obtained from the Tray Table content addressable memory (CAM —56) shown in FIG. 4. This positions the tray compartment over the slide transport mechanism (30). As the slide projector tray is rotated to the location specified by the LOC # from the tray table, the compartment corresponding to that location number is rotated to a position over the slot in the Carousel ™ tray. The opening in the slide compartment becomes aligned with the opening in the lower portion of the tray, thus allowing the slide to pass therethrough. The slide transport mechanism (30) is lowered to the position shown by dotted lines (31) through a slot in the chute (32) so that the slide therein is dropped into the cartridge. After the slide is dropped into the cartridge, the Bin Table for the cartridge is updated by writing the serial number of the slide in the row of the current position count (POS #) to thereby reflect the fact that the slide is now stored therein. The slide position count (POS #) is incremented by 1. The tray table shown above is updated by deleting the serial number of the slide from the row of the current location number (LOC #) to thereby reflect the fact that the slide is no longer stored therein.

The following shows an updated bin table for slides that are unloaded in sequential order starting with tray location 1 and ending at location 40. The first slide (025 003 001 13) originally stored in location 01 of tray number 142 (see Tray Table above) is stored at position 1 of cartridge number 20. The last slide (025 003 001 52) originally stored in location 40 of tray number 142 is stored at position 40 of cartridge number 20.

| | | BIN TABLE | | | | |
|---|---|---|---|---|---|---|
| BIN # | POS # | SLIDE SERIAL # | SEQ # | L | V | P |
| 20 | 01 | 025 003 001 13 | | 0 | 0 | 1 |
| 20 | 02 | 025 003 001 14 | | 1 | 1 | 1 |
| 20 | 03 | 025 003 001 15 | | 1 | 0 | 1 |
| 20 | 04 | 025 003 001 16 | | 1 | 1 | 1 |
| 20 | 05 | 025 003 001 17 | | 0 | 0 | 1 |
| 20 | 39 | 025 003 001 51 | | 0 | 0 | 1 |
| 20 | 40 | 025 033 001 52 | | 1 | 1 | 1 |

The Carousel ™ tray is stepped repeatedly and slides are dropped one-by-one into the cartridge below. Each time a slide is placed in the cartridge, the position count (POS #) for the cartridge is incremented by one and the bin table is updated by storing the slide serial number next to the current location. The slide serial number is deleted from the tray table. When one cartridge becomes full the location count will equal 40, which causes the next empty cartridge to be moved into place under the Carousel ™ tray. The location count is reset to its initial value and the process is repeated for the last 40 slides of the 80-slide tray.

UNLOADING NON-SEQUENTIALLY

Figure 8:
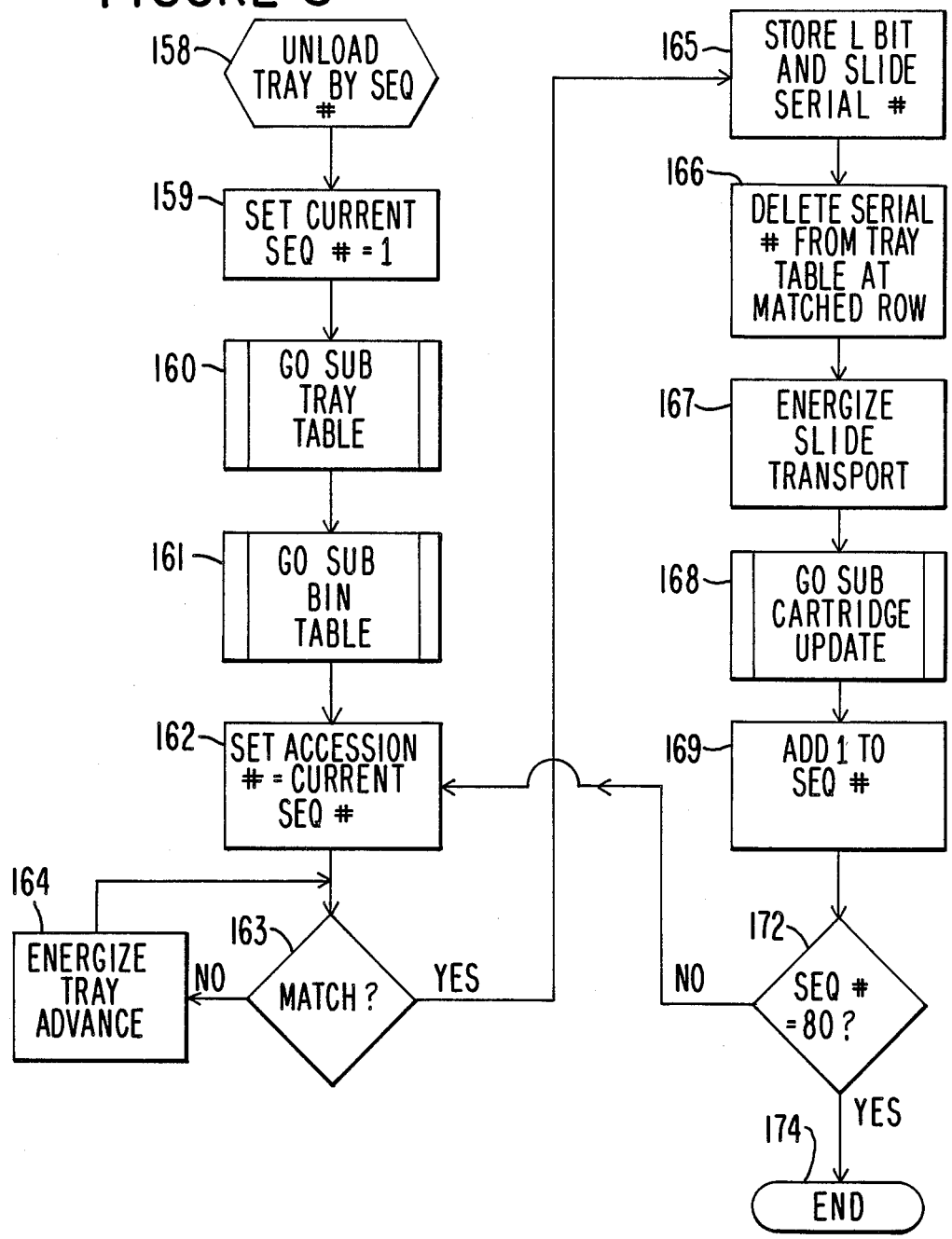

Slides may be unloaded from projector trays sequentially (FIG. 6) or in accordance with a sort algorithm (FIG. 8). If sequential unloading is specified, the software uses the LOC # column of the Tray Table and starts at LOC # 1 of the tray table and ends at LOC # 80. If a sort algorithm is specified, the software uses the user-selected sequence specified in the SEQ # column of the Tray Table.

For the first cartridge the software starts at SEQ # 1 of the tray table and ends at SEQ # 40. When the first cartridge is full (Bin # equals 40) a second cartridge is moved in place. For the second cartridge the software continues at SEQ # 41 of the tray table and ends at SEQ # 80.

The user selects the unload sequence (FIG. 7) by assigning sequence numbers opposite slide serial numbers in a list brought up on the computer screen (block 146). For example the slides in the above Tray Table could be sorted in accordance with the sequence numbers assigned as shown below:

| CAROUSEL ™ TRAY TABLE | | | | | |
|---|---|---|---|---|---|
| TRAY # | LOC # | SERIAL # | SEQ # | L | V |
| 142 | 01 | 025 003 001 13 | 41 | 0 | 1 |
| 142 | 02 | 025 003 001 14 | 02 | 1 | 1 |
| 142 | 03 | 025 003 001 15 | 56 | 1 | 1 |
| 142 | 04 | 025 003 001 16 | 05 | 1 | 1 |
| 142 | 05 | 025 003 001 17 | 07 | 0 | 1 |
| 142 | 40 | 025 003 001 52 | 03 | 0 | 1 |
| 142 | 79 | 025 003 001 91 | 01 | 1 | 1 |
| 142 | 80 | 025 003 001 92 | 31 | 1 | 1 |

Figure 4:
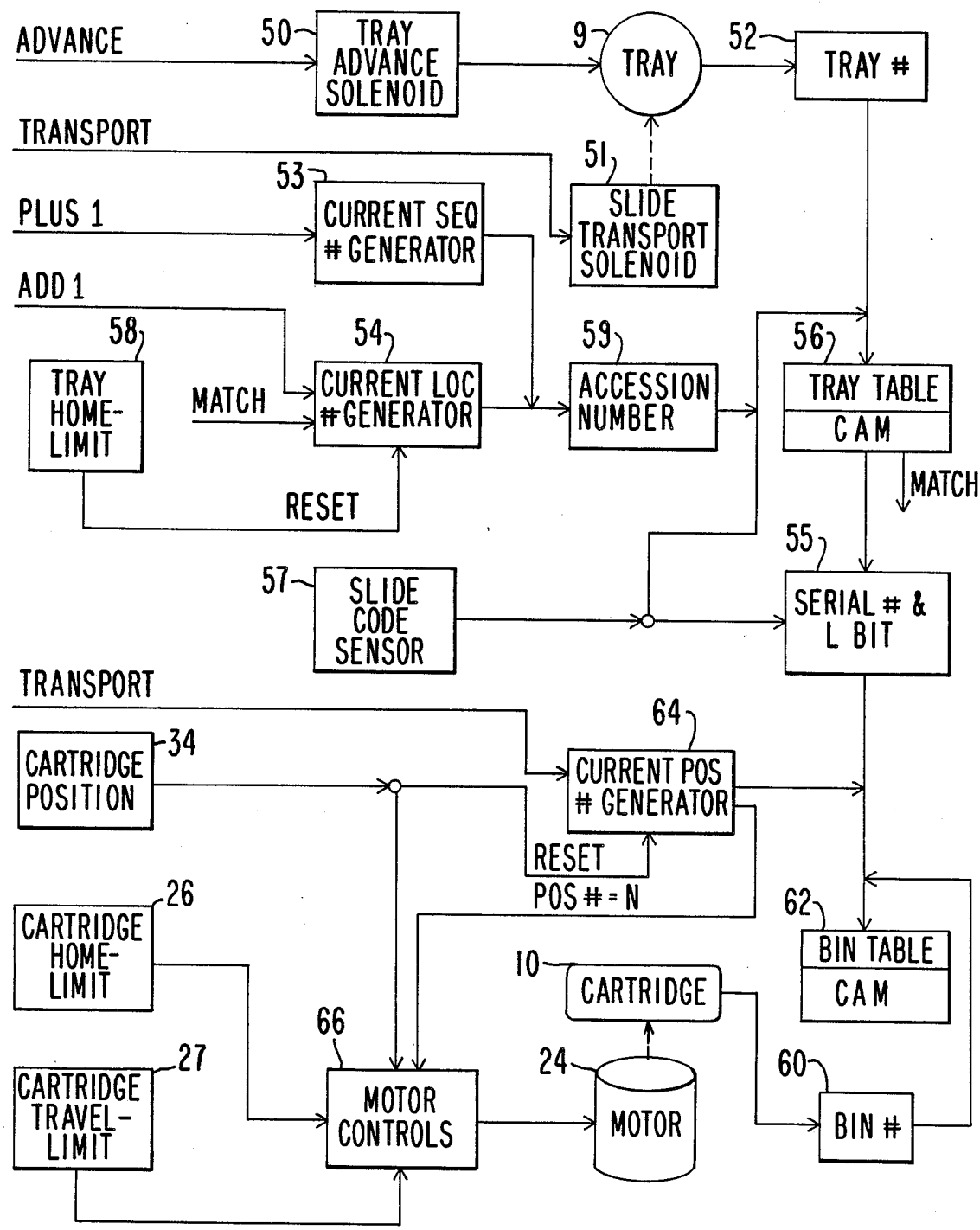
FIG. 4 is a logic diagram of the electronic controls for the apparatus of FIGS. 1-3: and, FIGS. 5 through 12 are flow diagrams of computer programs for interfacing the apparatus of FIGS. 1-3 with a computer and for utilizing the invention therewith.

The software uses the SEQ # as the search column instead of the LOC # column, starting with a search argument of 1 output from the sequence # generator (53) of FIG. 4, and increasing the search argument by one after each slide unload. For an 80-slide tray, two cartridges must be used, with 40 slides in each. In this example the slide at LOC # 79 corresponding to SEQ # 01 inputted by the user will be the first slide unloaded.

ELECTRONIC COMPUTER INTERFACE

The computer interface is similar to the interface described in the above-identified U.S. Pat. No. 4,693,373, with different inputs and outputs. The inputs and outputs are shown in FIG. 4. The inputs are:
Slide-code sensor
Tray Home-limit switch
Cartridge Home-limit switch
Travel-limit switch
Cartridge position sensor
The outputs are:
Cartridge motor
Tray advance solenoid
Slide transport solenoid The operation of the hardware interface will become clear in the description of the logic in the following section, which references the inputs and outputs listed above.

ELECTRONIC LOGIC

Referring now to FIG. 4, a functional block diagram illustrating the invention is shown. A tray advance mechanism (24; 28) shown in FIG. 1 is provided for advancing the tray in response to energization of tray advance solenoid (50), so that successive ones of the compartments coincide with the slide gate (7) shown in FIG. 1. When a tray is placed on one of the spindles (3 or 4) one of the switches (5 or 6) is activated by the bottom of the tray thusly electrically selecting side A or side B. There is a hole in the tray which allows one of the switches to pass therethrough so it will remain unactivated. A keyway and switch (13 or 15) registers the tray at its home-limit position. The tray home-limit sensor (58) resets the current location number generator to its initial value of one. The Current location number generator (54) operative in connection with the ADVANCE signal, generates a current location number (LOC #) which represents the unique location number of the slide compartment currently coinciding with the slide gate (7). The appropriate A side or B side tray-code sensor (14; 16) senses the tray code (TRAY #) and stores it in TRAY # register (52). The TRAY # is used as a search argument into a content addressable memory (CAM-54) to recall the tray table for this tray. An accession number (SEQ #-LOC #-serial number) is used as part of the search argument is used in accession number register (59) to select a row entry of the CAM. In accordance with well known CAM mask-selection techniques, any one of the parameters may be masked to allow accessing by any one or more parameters.

The current location # generator (54) maintains a count of the tray compartments as the tray is rotated from the home-limit position. The ADD 1 input to the current location # generator (54) is energized successively each time the tray advance solenoid (50) is energized. The match line from the CAM (56) is asserted when the current LOC # matches the LOC # in the CAM. This means that the tray (9) is at the desired compartment. The slide transport solenoid (51) activates the transporting mechanism (30) at the slide gate (7) to lower a slide from the selected one compartment of the tray such that the slide drops into the cartridge (10). As the slide is lowered it passes by a slide-code sensor which reads a slide-code label on the slide and stores the number in the register (57).

The Tray Table in the Tray Table CAM (56) maintained by software associates a unique location number (LOC #) for each one of the plurality of compartments of the tray with a previously assigned serial number, each serial number identifying a slide stored in a compartment of the tray. The tray (9) is advanced until the generated location number (54) matches the location number in the Tray Table CAM (56). The serial # and L bit are read out of the matched row and stored in the register (55).

A bin-code sensor (17) senses the bin code (BIN #) and stores it in register (60). The BIN # is used as part of a search argument into a Bin Table content addressable memory (CAM-62) to access a bin table for this cartridge. The Bin Table maintained by software associates a unique location number for each one of the plurality of slide positions of the cartridge with the slide serial number, each serial number identifying a slide stored in the cartridge. A Current position number generator (64) operative in connection with the TRANSPORT signal generates a current position number (POS #) which represents the unique position of the slide. The position number is incremented by one each time the slide transport mechanism is activated. The BIN # is used as part of the search argument into the Bin Table CAM (62) to access the row for the current position. The slide serial number and L bit stored in the register (55) is written into the row which matches the current position number. If this slide has a slide-code label, L will be equal to 1 in which case, the slide serial number from the slide code sensor (57) is substituted for the serial number stored in the register (55). When the current position number is equal to N (the capacity of the slide cartridge) a new cartridge is moved into position. The output POS #=N from the current position number generator starts the motor (24). The cartridge position sensor (34) resets the current position generator to its initial value of one when the motor (24) has driven the new cartridge into place. The cartridge position sensor (34) also goes to the motor controls (66) and stops the motor. This procedure is repeated for the four cartridges in the drawer. After the last cartridge is in position, the output POS #=N from the current position number generator is prevented from starting the motor (24) by closure of the cartridge travel limit switch (28) which turns on a flip-flop in the motor controls (66). Closing the cartridge home-limit switch (26) will start the motor again as a new drawer is inserted and will reset the travel limit flip-flop. The following is a timing diagram of the above described operation:

| | | | | | |
|---|---|---|---|---|---|
| HOME LIMIT | :-: | | | | :-: |
| POS. SENSOR | :-: | :-: | :-: | :-: | |
| MOTOR | :---: | :---: | :---: | :---: | :--- |
| POS # = N | | :-: | :-: | :-: | :-: |
| TRAVEL LIMIT | | | | | :---------: |

If a slotted tray is used as a cartridge, then N=1, and the cartridge will step one vertical compartment at a time until the travel limit is reached.

COMPUTER SOFTWARE

In addition to the software described herein, the present invention uses the CYMAGERY TM software described in the CYMAGERY TM User's Manual which is incorporated herein by reference. Copies can be obtained from Stock Imagery, Inc. 711 Kalamath, Denver, Colo. 80204.

Before a projector tray is unloaded it is necessary to assign serial numbers for each slide stored therein if the user wants the computer to keep track of where slides have been transferred. The CYMAGERY TM software is used for this purpose. In addition, the software of the present invention creates and updates the software tables described above that keep track of where slides are stored. Each slide projector tray is provided with a unique coded label (TRAY #) that is read and entered into the computer. Each slide cartridge is provided with a unique coded label (BIN #) that is read and entered into the computer. The software uses the these code numbers to recall Tray Tables for trays and Bin Tables for cartridges. The subroutines BINTABLE (FIG. 9) and TRAYTABLE (FIG. 10) are then called by the software flows when needed.

TRAYTABLE SUBROUTINE

Figure 10:
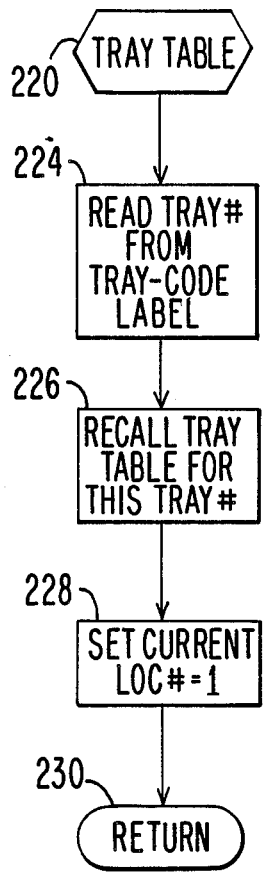

The TRAYTABLE subroutine shown in FIG. 10 uses the number read (block 224) from the coded label on the projector tray in position to deliver slides from the projector tray to recall (block 226) a Tray table created for that tray. A count is maintained of slide compartments of the tray as they are moved into position for unloading. This count (current LOC #) is initially set to 1 (block 228).

BINTABLE SUBROUTINE

Figure 11:
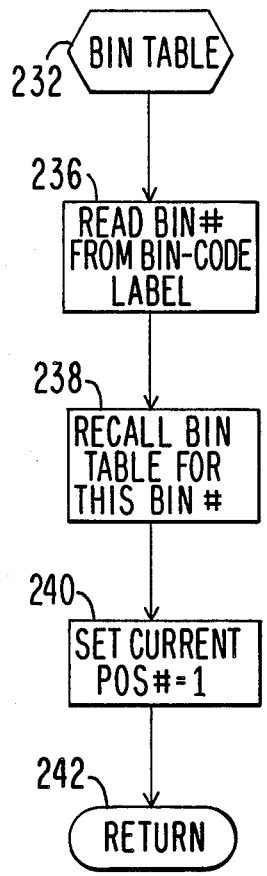

The BINTABLE subroutine shown in FIG. 11 uses the number (BIN #) read from the coded label (block 234) on the current cartridge in position to receive slides unloaded from a projector tray to recall (block 238) a bin table created for that cartridge. A count is maintained of slide positions in the cartridge for slides dropped into the cartridge. For an empty cartridge, this count (current POS #) is initially set to 1 (block 240).

CREATE FILE

Figure 5:
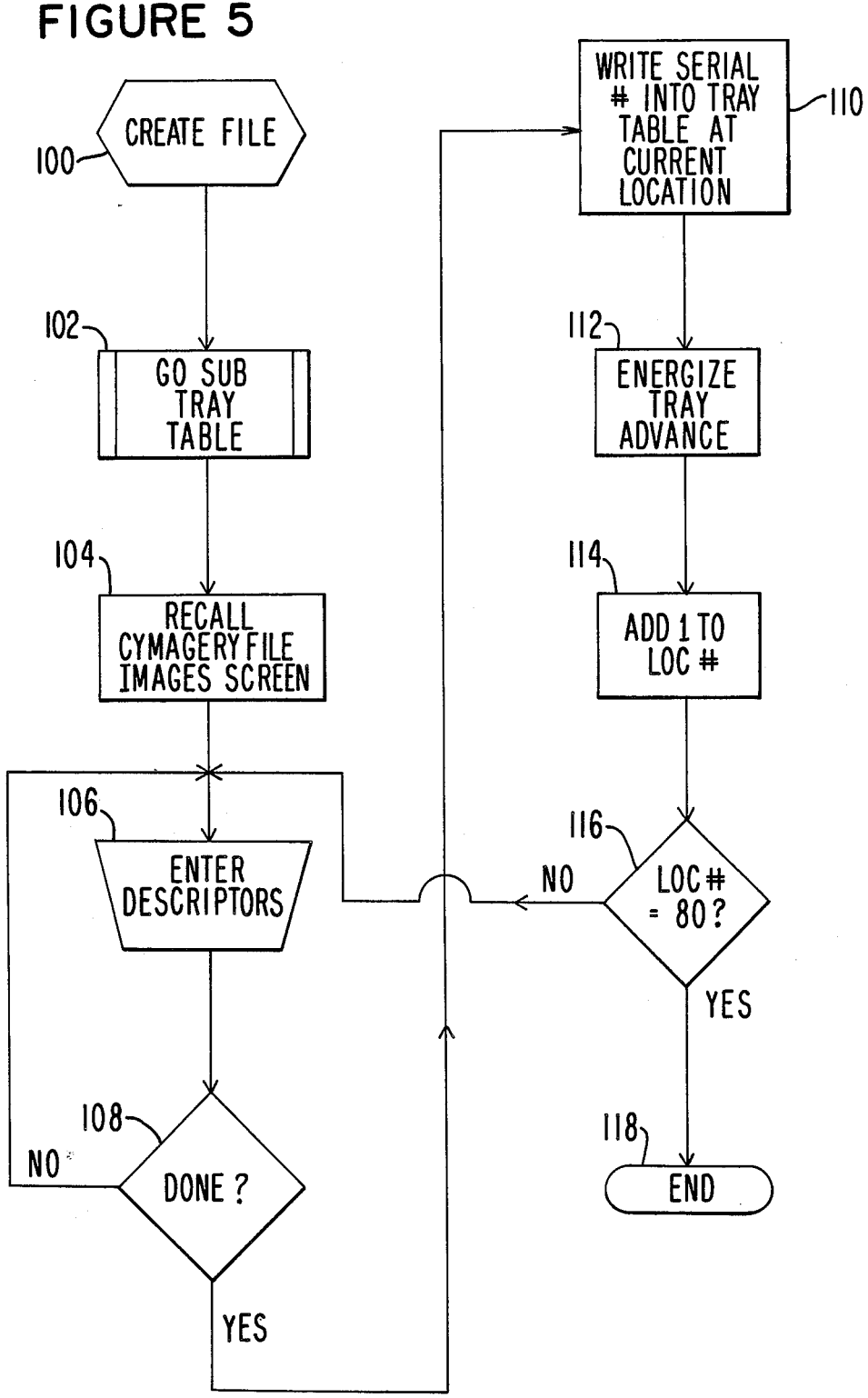

Refer to FIG. 5. The Create File menu option is used to enter slide descriptors into the computer for a projector tray whose slide contents have not been previously accounted for by the software. It may also be used when slide-code labels are not used (L=0) to correct the Tray Table for a projector tray whose contents have been reordered.

The CREATE FILE routine (100) first calls the TRAYTABLE subroutine (102) which initializes the current empty tray table (see FIG. 10). Next the FILE IMAGES screen of CYMAGERY TM is brought up (104) so that image data can be entered (106). The FILE IMAGES menu option of the CYMAGERY TM software allows the user to input new image data into the computer where the data is filed according to image description The filing process is accomplished by selecting a general subject (GS) and a specific subject (SS) from the lists on the screen. Once this is done, other data may be entered. CYMAGERY TM automatically assigns a unique serial number to the slide and the image data corresponding to that slide. The image serial number consists of General Subject number, Specific Subject number, Page number, and slot number. When all data has been entered, CYMAGERY TM will prompt for LABEL inputs. The user can then print a bar code label for the serial number which can be affixed to the slide. When done (108) the software writes (110) the slide serial number into the current tray table at the current location number (LOC #). The tray advance mechanism is energized (112) to index to the next slide compartment and one is added to the location count (114). A test is made (116) to see if the location count has reached 80, the slide capacity of the tray. If YES the flow is complete (block 118) and all slides have been entered into the data base file and the tray table for this tray. If NO the sub-loop is repeated.

UNLOAD SEQUENTIAL

Figure 6:
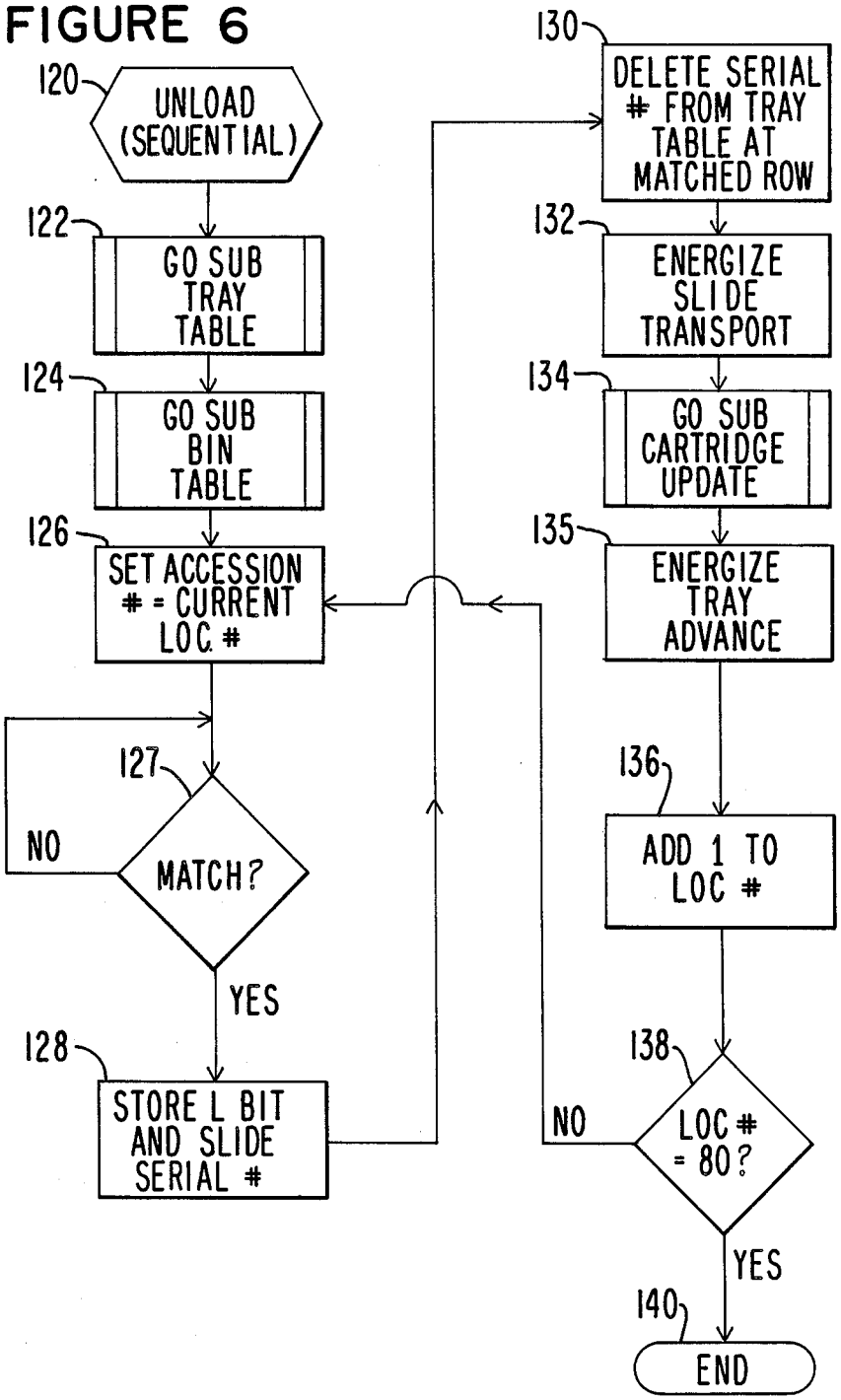

Refer to FIG. 6. In the simplest case, slides are unloaded sequentially into storage cartridges beginning at tray compartment one and ending at tray compartment 80. In this manner, a slide presentation is kept in its original order. First the TRAYTABLE subroutine (122) is called which sets the LOC count to 1. Next the BINTABLE subroutine (124) is called which sets the POS count to 1. Next (block 126) the current LOC #, which corresponds to the slide compartment at the slide gate, is used in the accession number register (59) to search the Tray Table. The slide serial number and the L bit at this current location are stored (block 128) in a register (55) and deleted from the Tray Table (block 130). The slide transport mechanism is activated (block 132) and the CARTRIDGE UPDATE subroutine described below is called (block 134). Before describing the CARTRIDGE UPDATE subroutine the PROJECTION MODE Subroutine will be described.

PROJECTION MODE SUBROUTINE

Figure 12:
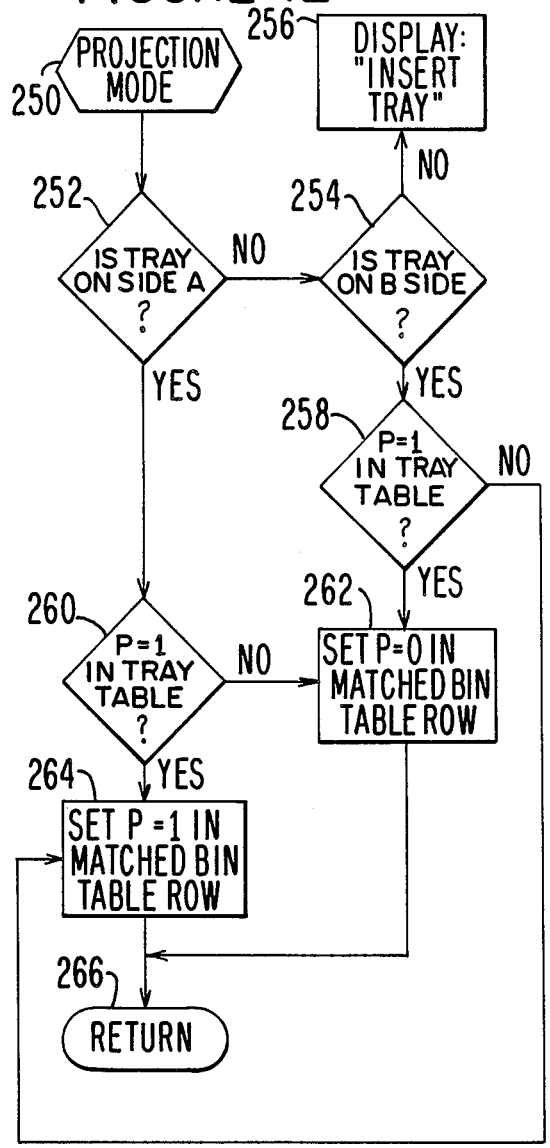

The PROJECTION MODE Subroutine is shown in FIG. 12. First the mode switches (5 and 6) of FIG. 1 are checked to see if the tray is on the A side or the B side (blocks 252, 254). If on the A side the slides will be unloaded without changing the orientation. So if the P bit is one (block 260), the tray was loaded for normal projection and will be unloaded without changing the orientation. The P bit in the Bin Table will be set to one (block 264). If the user wants to reload the projector tray for reverse-screen projection, using the tray loader described in the above-identified U.S. Pat. No. 4,693,373, this tray has to be unloaded from the B side. An appropriate screen prompt (not shown) can be used to guide the user in this respect. If the Tray is on the B side (block 254), the slides will be unloaded changing the orientation. So if the P bit is a one (block 258), the P bit in the Bin Table will be set to zero (block 262). Now when a projector tray is reloaded from this cartridge, using the tray loader described in the above-identified U.S. Pat. No. 4,693,373, the slide orientation will be appropriate for reverse projection. The bin table stores the P-bit setting so that the tray table for the reloaded tray will updated to have its tray table P-bits also set to zero. To summarize, if the tray is on the A side, the P bit is given the same value in the bin table that it had in the tray table. If the tray is on the B side, the P bit is given the opposite value in the bin table that it had in the tray table.

CARTRIDGE UPDATE SUBROUTINE

Figure 9:
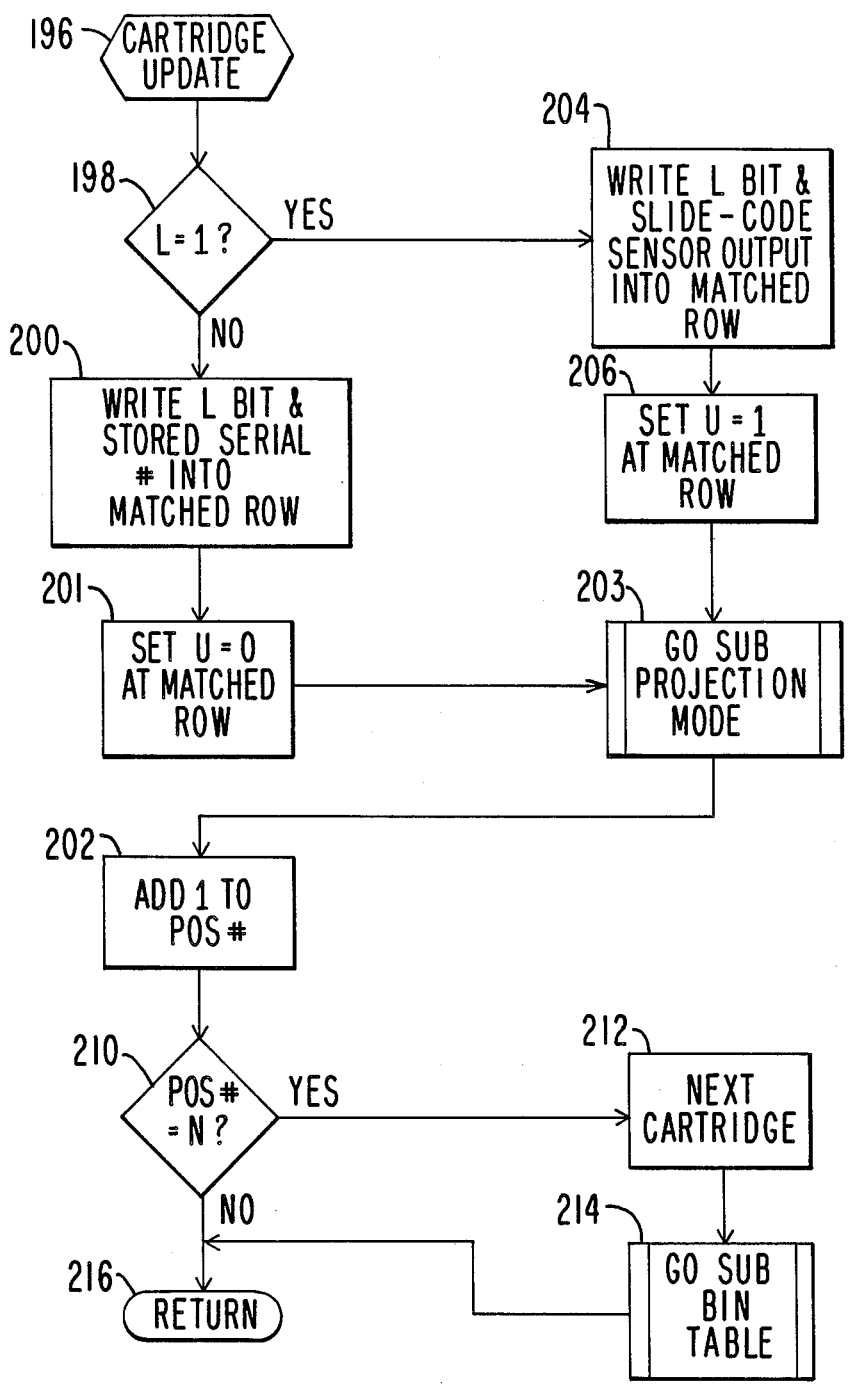

The CARTRIDGE UPDATE subroutine is shown in FIG. 9. First the label (L) bit previously stored (block 128) from the Tray Table is tested (block 198) to see if slide-code labels are used on this slide. If yes the valid (V) bit is set to one (Block 206) and the L-bit and the serial number read by the slide-code reader (block 204) are written into the current POS # in the Bin Table. The POS # is incremented by one (block 202). Next the POS # is checked to see if if has reached the capacity (N) of the cartridge (block 210). For a magazine N=40. and for a slotted tray, N=1. If yes, the next cartridge is moved into position (block 212) and its Bin Table is initialized (block 214). The flow then returns (block 216) to the calling routine. When the flow returns, a one is added to the LOC # (block 136)and the loop is repeated until all 80 compartments have been unloaded (block 138).

SELECT SEQUENCE

Refer to FIG. 7. In some cases it is desirable to unload slides to storage cartridges in a particular order. In this case, the computer program unloads slides in a nonsequential order by moving the tray to non-sequential slide compartments so that slides are unloaded into the storage cartridge in a chosen sequence. First the TRAY TABLE subroutine is called (block 144) and a list of slides in the table are displayed on the computer screen (block 146). The screen is highlighted at the row corresponding to the current LOC # (block 148). The user is prompted to insert a SEQ # for the row (block 150). When done, the LOC # is incremented by one to select the next row (block 154) and the loop is repeated until all 80 locations have been assigned a SEQ # (block 158).

The tray can now be unloaded sequentially as described above with reference to FIG. 6, described above, or in the selected sequence as shown in FIG. 8, described below.

UNLOAD BY CHOSEN SEQUENCE

Refer to FIG. 8. In this case, slides are unloaded into storage cartridges beginning at sequence number one and ending at sequence number 80. First the current SEQ # is set to one (block 159). Next. the TRAYTABLE subroutine (160) is called which sets the LOC count to 1. The BINTABLE subroutine (161) is called which sets the POS count to 1. Next (block 162), the current SEQ # is used in the accession number register (59) of FIG. 4, to search the Tray Table CAM (56). The tray advance is activated (block 166) until the desired compartment is at the slide gate as indicated by a match from the CAM (56). The slide serial number and L-bit at the matched location is stored (block 163) in a register (55) and deleted from the Tray Table (block 164). The slide transport mechanism is activated (block 167) and the CARTRIDGE UPDATE subroutine is called (block 168). When the flow returns, a one is added to the SEQ # (block 169) and the loop is repeated until all 80 compartments have been unloaded (block 172).

SPECIFIED STORAGE LOCATIONS

This feature provides the flexibility needed by some users (such as stock photo agencies) whose requirements dictate that slides be returned to their original physical storage location. As described above, the Cymagery TM program assigns an image serial number which consists of General Subject number, Specific Subject number, Page number, and slot number (for use with plastic slotted pages). In the present invention the page number will refer to a cartridge (page number=-BIN #), and the slot number will refer to one of 40 index positions in the cartridge (slot number=POS #). Since the page number and slot number are part of the slide serial number, the information is in the Tray Table. To return slides to a fixed location as originally assigned by CYMAGERY TM, the slot number is used instead of the SEQ # in the routine of FIG. 8. Slides are returned only to the cartridge which corresponds to the page number assigned by CYMAGERY TM.

SERIAL NUMBER CHECKING

A coded serial number on the slide is read by one of the optical readers 20 or 22, depending upon the orientation (reverse or normal projection) of the slide, as the slide exits the tray. If the slide had been previously entered into the computer data base, a serial number will have been assigned to the image and placed on the slide itself. In this case, the software table can be constructed by placing the serial number so read into the appropriate address location in the table. As shown in FIG. 9, (block 206) the validity (V) bit is set to one if the slide-code is read. This slide code reading capability may also used as a check on the integrity of the serial number listing for the projector tray being unloaded by comparing the actual serial number read off the slide with the slides listed for this tray.

Refer to FIG. 2. A reflective strip (36) is placed on the under side of the drawer at each position of the cartridge. A drawer-position sensor (34) shines a light on this strip and senses a reflection. If a cartridge-code label is not used, the computer can use the position of the drawer (11), and hence the cartridge as being in one of many unique positions. As shown in FIG. 1, a drawer home-limit microswitch (26) closes when the drawer is positioned at the home position. The computer program uses the home position as a reference point from which to count magazines in the magazine drawer.

The system is described with reference to circular trays and linear drawers with removable magazines. It should be understood that the invention can be modified to operate with linear trays and/or circular drawers with fixed bins or removable magazines. For example, the chute (32) shown in FIG. 2 is curved so that slides enter the cartridge in a flat orientation such that slides are stacked therein. This chute can be replaced with a straight chute (shown by the dotted lines 33, 35) such that slides enter the cartridge in a vertical position. In this case, a slotted tray can be substituted for the magazines shown in FIG. 2. This might be used, for example, where it is desired to transfer slides from circular trays to linear trays.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A slide tray unloader comprising:
   a slide magazine, said magazine being constructed so as to hold slides therein in a stack, with one slide stacked upon another;
   a slide gate;
   first means for holding said slide magazine below said slide gate;
   second means for holding a tray having a plurality of compartments therein about said slide gate such that one of said compartments coincides with said slide gate;
   means at said slide gate for transporting a slide from said selected one compartment of said tray such that said slide is reorientated from said vertical position to a horizontal position to thereby drop said slide into said magazine; and,
   means for advancing said tray to position a particular compartment to coincide with said slide gate.

2. The slide tray unloader of claim 1 wherein said slide cartridge comprises:
   a plurality of slide magazines having slides stored therein in a stack; and,
   a slide tray drawer having means for receiving said plurality of slide magazines.

3. The slide tray unloader of claim 1 wherein said second means for holding said tray above said slide gate such that one of said compartments coincides with said slide gate is operable to selectively hold said tray in a first position to allow slides to be transported while maintaining a first orientation of said slides or in a second position to allow slides to be transported while maintaining a second orientation of said slides, said second orientation being the reverse of said first orientation.

4. A slide tray unloader for transferring slides from a slide tray having a plurality of slide compartments therein to a slide cartridge adapted to store a plurality of slides comprising:
   a slide gate;
   first means for holding said slide cartridge below said slide gate;
   second means for holding said slide tray above said slide gate such that one of said compartments coincides with said slide gate;
   means at said slide gate for transporting a slide from said one compartment of said tray into said cartridge;
   means for advancing said slide tray to position a particular compartment to coincide with said slide gate;
   means associated unique location numbers for said plurality of compartments of said tray with previously assigned serial numbers, each serial number identifying a slide stored in a compartment of said tray; and,
   means operative in connection with said advancing means for generating a current location number which represents the unique location number of the slide compartment currently coinciding with said slide gate.

5. The slide tray unloader of claim 4 wherein said means for advancing said slide tray to position a particular compartment includes means for asserting an advance signal and wherein said associating means includes means for selecting one of said unique location numbers and for asserting a match signal upon the condition that said current location number matches said selected one of said unique location numbers, said combination further comprising:
   means connected to said advancing means and to said match signal for causing said tray to move in response to said advance signal and to stop in response to said match signal.

6. The slide tray unloader of claim 4 further comprising:
   a home limit position associated with said slide tray;
   and wherein said means for generating a current location number includes
   means for sensing said home-limit position of said tray, and,
   means for calculating said current location number for each compartment based upon its relative position from said home-limit position of said tray.

7. The slide tray unloader of claim 4 wherein at least one of said slides has a slide code thereon, said unloader further comprising:
   slide-code detector means for detecting said slide code;
   said slide-code detector being located with reference to said slide gate such that a slide transported by said transporting means passes by said slide-code detector.

8. The slide tray unloader of claim 4 wherein said means at said slide gate for transporting a slide from said selected one compartment of said slide tray into said cartridge comprises means for maintaining said slide in the same orientation that said slides have in said slide tray.

9. The slide tray unloader of claim 4 wherein said slide cartridge has affixed thereto an electronically readable cartridge-code, said combination further comprising:
   a cartridge-code reading station located so as to be in a position to read said cartridge-code.

10. The slide tray unloader of claim 4 further comprising:
    means for maintaining a first computer-readable file-record of data correlating a slide with a compartment of said tray; and,
    means for modifying said first file-record to reflect the fact that said slide has been transported from said selected one compartment of said tray located at said slide gate.

11. The slide tray unloader of claim 10 further comprising:
    means for maintaining a second computer-reliable file-record of data correlating a slide with its location in said stack of slides in said cartridge; and,
    means for modifying said first file-record to reflect the fact that said slide has been transported from said selected one compartment of said tray located at said slide gate.

12. A method of transferring a particular slide of a plurality of slides in a plurality of vertical compartments of a tray into a storage magazine, said magazine being constructed so as to hold slides at individually distinct positions therein in a stack, with one slide stacked upon another, comprising the steps of:

A. holding said tray having a plurality of slide compartments therein above a slide gate such that a selected one of said compartments coincides with said slide gate;

B. holding said slide magazine below said slide gate and in slide-receiving registration therewith;

C. advancing said tray to position a particular selected compartment over said slide gate; and, D. transporting a slide from said compartment of said tray located at said slide gate such that said slide is reorientated from said vertical position to a horizontal position and drops into said magazine such that one slide is stacked upon another.

13. A method of transferring a particular slide of a plurality of slides in a tray into a storage cartridge comprising the steps of:

A. holding a tray having a plurality of slide compartments therein above a slide gate such that a selected one of said compartments coincides with said slide gate;

B. holding a slide cartridge capable of storing a plurality of slides at individually distinct positions therein below said slide gate and in slide-receiving registration therewith;

C. advancing said tray to position a particular selected compartment over said slide gate;

D. transporting a slide from said compartment of said tray located at said slide gate such that said slide drops into said cartridge;

E. maintaining a first computer-readable file-record of data correlating a slide with a compartment of said tray;

F. maintaining a second computer-readable file-record of data correlating a slide with a slide position of said cartridge; and, G. modifying said first file-record to reflect the fact that said slide has been removed from said tray, and modifying said second file-record to reflect the fact that said slide has been added to said cartridge, upon the condition that a slide is transported from said tray and into said cartridge.

14. The method in accordance with claim 13 wherein a slide has affixed thereto a first electronically readable slide code that distinguishes said particular slide from others of said slides, and wherein said step D further comprises the steps of:

reading said first electronically readable slide code as said slide is transported from said compartment of said tray past a slide-code reading station to thereby produce a slide-code signal.

15. The method in accordance with claim 13 wherein said tray has affixed thereto an electronically readable tray code that distinguishes said tray from other trays, and wherein a cartridge has affixed thereto an electronically readable cartridge code that distinguishes said cartridge from other cartridges, said method further comprising the steps of:

E. reading said electronically readable tray code by means of a tray-code reading station to thereby produce a tray-code signal;

F. reading said electronically readable cartridge-code by means of a cartridge-code reading station to thereby produce a cartridge-code signal;

G. using said tray-code signal to recall a first computer-readable file-record of data correlating a slide with a compartment of said tray;

H. using said cartridge-code signal to access a second computer-readable file-record of data correlating a slide with a slide position of said cartridge; and, I. upon the condition that a slide is transported from said tray and into said cartridge, modifying said first file-record to reflect the fact that said slide has been removed from said tray, and modifying said second file-record to reflect the fact that said slide has been added to said cartridge.

16. The method in accordance with claim 13 wherein a slide has affixed thereto an electronically readable slide code that distinguishes said particular slide from others of said slides, said method further comprising the steps of:

E. maintaining a first computer-readable file-record of data correlating a particular slide with a compartment location number of said tray;

F. reading said slide code as said slide is transported from said compartment of said tray past a slide-code reading station to thereby produce a slide-code signal;

G. generating a compartment location number corresponding to the slide tray compartment registered with said slide gate; and, H. utilizing said slide-code signal in conjunction with said first file record data to verify the accuracy of said first file record data.

17. A method of transferring a particular slide of a plurality of slides in a tray into a storage cartridge comprising the steps of:

A. holding a tray having a plurality of slide compartments therein such that a selected one of said compartments coincides with a slide removing mechanism;

B. holding a slide cartridge in slide-receiving registration with said slide removing mechanism, said cartridge being constructed so as to store a plurality of slides at individually distinct positions therein;

C. advancing said tray to position a particular compartment at said slide removing mechanism;

D. reading an electronically readable tray code that distinguishes said tray from other trays by means of a tray-code reading station to thereby produce a tray-code signal;

E. reading an electronically readable cartridge-code that distinguishes said cartridge from other cartridges by means of a cartridge-code reading station to thereby produce a cartridge-code signal;

F. using said tray-code signal to access a first computer-readable file-readable file-record of data correlating a slide with a compartment of said tray;

G. using said cartridge-code signal to access a second computer-readable file-record of data correlating a slide with a slide position of said cartridge; and, H. activating said slide removing mechanism to thereby transfer a slide from said compartment of said tray located at said slide removing mechanism to one of said individually distinct positions of said cartridge;

I. modifying said first file-record to reflect the fact that said slide has been removed from said tray; and, J. modifying said second file-record to reflect the fact that said slide has been added to said cartridge.

18. The method in accordance with claim 17 wherein a slide has affixed thereto an electronically readable slide code that distinguishes said particular slide from others of said slides, and wherein said step H further comprises the step of:

reading said electronically readable slide code as said slide is transferred from said compartment of said tray past a slide-code reading station to thereby produce a slide-code signal.

19. The method in accordance with claim 17 wherein said slide has affixed thereto a electronically readable slide code that distinguishes said slide from others of said plurality of slides, said method further comprising the steps of:

F. reading said slide code as said slide is transferred from said compartment of said tray past a slide-code reading station to thereby produce a slide-code signal;

G. generating a compartment location number corresponding to the slide tray compartment positioned at said slide removing mechanism; and, H. utilizing said slide-code signal in conjunction with said first file record data to verify the accuracy of said first file record of data correlating said slide with a compartment of said tray.

20. The method in accordance with claim 17 wherein the slide removing mechanism includes means to selectively transfer slides maintaining a first orientation of said slides or a second orientation of said slides, and wherein said first computer-readable file-record of data correlating a slide with a compartment of said tray includes an indicia (P bit), said indicia when set to a first state representing said first orientation of said slides in said tray and when set to a second state representing said second orientation of said slides in said tray, said method further comprising the steps of:

modifying said second file-record to reflect the fact that said slide has been removed from said tray maintaining said first orientation by said indicia being given the same value in said second file-record that it had in said first file-record and, modifying said second file-record to reflect the fact that said slide has been removed from said tray to said second orientation, by said indicia being given the opposite value in said second file-record that it had in said first file-record.

* * * * *